Dec. 27, 1927.
C. S. HALL
1,653,849
THERMAL CIRCULATION SYSTEM FOR AIRCRAFT
Filed Jan. 18, 1926    2 Sheets-Sheet 2
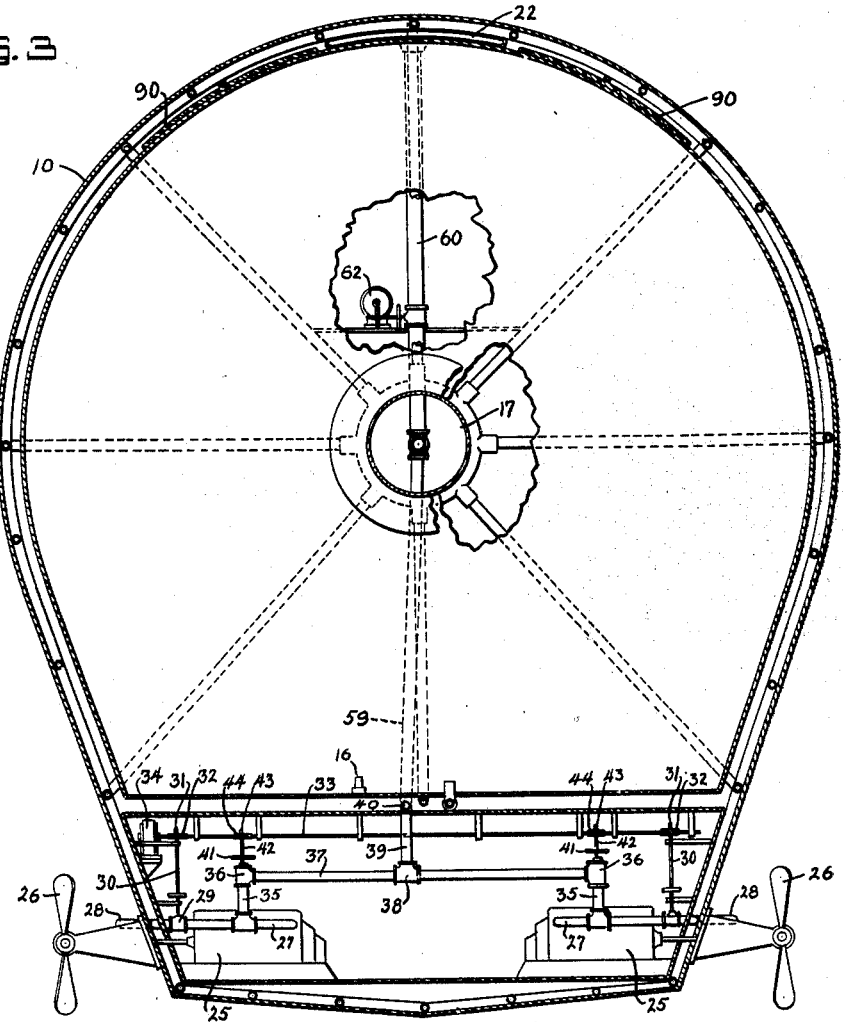
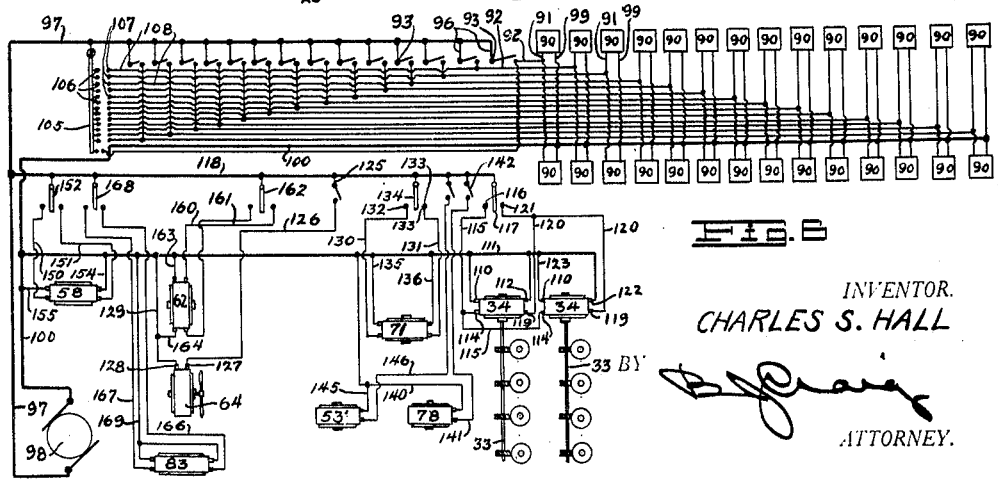
INVENTOR.
CHARLES S. HALL
ATTORNEY.

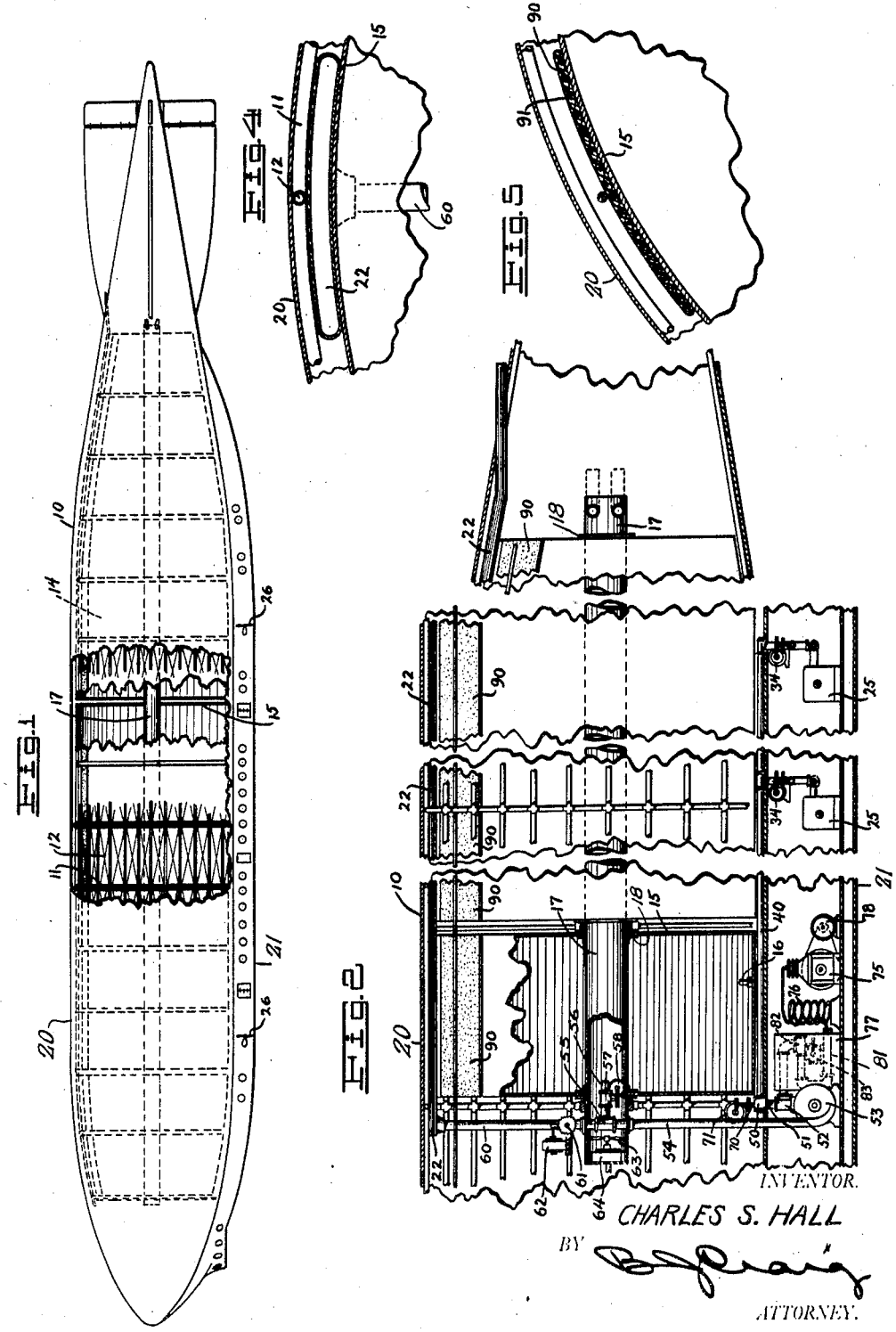

Patented Dec. 27, 1927.

1,653,849

UNITED STATES PATENT OFFICE.

CHARLES S. HALL, OF OAKLAND, CALIFORNIA, ASSIGNOR TO HALL AIRWAYS CORPORATION, OF DOVER, DELAWARE, A CORPORATION.

THERMAL CIRCULATION SYSTEM FOR AIRCRAFT.

Application filed January 18, 1926. Serial No. 81,932.

This invention relates to thermal circulation systems for lighter-than-air aircraft.

The general object of the invention is to provide an improved means for heating and cooling the lifting gases of aircraft.

A specific object of the invention is to provide means whereby the heat produced by the propelling engine of an aircraft may be utilized to heat the lifting gas of the aircraft.

A further object of the invention is to provide means for heating and cooling the lifting gases of an aircraft and wherein certain portions of the lifting gas may be heated while the remainder may be cooled.

A further object of the invention is to provide means including a flexible electric heating pad for heating the gas compartments of an aircraft.

Other objects of the invention will be apparent from the following description taken in connection with the accompanying drawings, wherein:

Fig. 1 is a side elevation partly broken away showing an aircraft embodying the features of my invention;

Fig. 2 is a fragmentary sectional view showing an aircraft embodying the features of my invention;

Fig. 3 is a transverse section of an aircraft embodying the features of my invention;

Fig. 4 is a fragmentary sectional view showing the upper heating compartment;

Fig. 5 is a fragmentary sectional view showing the electric heating device, and

Fig. 6 is a wiring diagram.

Referring to the drawing by reference characters, I have shown an aircraft embodying the features of my invention at 10. This aircraft preferably comprises an elongated hollow body of the rigid type, although it will be understood that the body may be semi-rigid or flexible without departing from the spirit of my invention.

The body is provided with transverse framing 11 and with longitudinal framing 12 to hold it in proper position. The body is provided with a plurality of compartments 14 in which gas holding containers 15 are arranged. These gas holding containers are preferably rigid and are provided with suitable pipes 16 so that gases may be run into the compartments or may be removed therefrom in any desired manner.

Extending longitudinally throughout all of the compartments and in substantial alignment with the longitudinal axis of the aircraft I arrange a warm air conducting member 17. This member is preferably made of metal or other material which is a good conductor of heat so that the heat from the walls thereof will warm the gas in the compartments 15. The ends of the compartments have gaskets or other means 18 thereon to prevent leakage of lifting gas from the compartments where the pipes pass through.

The upper portion of the aircraft is preferably curved as at 20 while the lower portion of the aircraft is more or less flat as shown at 21 so that stability and good flying qualities will be present in the aircraft.

Within the upper portion of the body and outside of the compartments 15 I arrange a hollow longitudinally extending curved member 22. This member, like the member 17, may be made of metal or other good conductor of heat so that the member 22 may serve to warm the upper portion of the gas holding compartments.

The aircraft is adapted to be driven by suitable internal combustion engines 25 which are preferably arranged in pairs fore and aft of the aircraft. These engines are adapted to drive propellers 26 which are shown as of the swivelling type, although the specific construction of the propellers forms no part of my present invention.

Each of the engines is provided with an exhaust pipe 27 from which a pipe 28 extends to the atmosphere. These pipes 28 are provided with valves 29, the valve stems 30 of which have gears 31 thereon engaging gears 32 on a shaft 33 which is driven by a motor 34. The motors 34 are reversible and when operated in one direction will open the valves 29 and when operated in the other direction, will close these valves.

Each pipe 27 is connected to a pipe 35 which engages a fitting 36 which is in turn connected to a pipe 37. These pipes 37 are connected to fittings 38 which are connected by a pipe 39 with a longitudinally extending pipe 40. It will be understood that the pipes 39 are near each end of the vessel and that the pipe 40 extends from these pipes 39 forward. The fittings 36 are each provided with valves 41 to control communication between the pipes 35 and the pipes 37. The valves 41 include valve stems 42 having gears 43 thereon meshing with gears 44 on the shaft 33. The arrangement of the gears 31, 32, and 43, 44 is such that when the motors 34 close the valves 29 the valves 41 will open, and when the motors are reversed to open the valves 29, they will close the valves 41.

It will thus be apparent that the exhaust from the engines 25 may be directed to the atmosphere or may be directed to the pipe 40 as desired. The pipe 40 communicates with a fitting 50 as shown in Fig. 2. This fitting is connected by a pipe 51 with a coupling 52 which is connected to a blower 53 which is operated by a motor 53'. The blower 53 is connected to a pipe 54 which passes through the heating member 17 and has a coupling 55 in this heating member from which a discharge 56 extends. This discharge 56 includes a valve 57 which may be open and closed by a motor 58.

From the coupling 55 a pipe 60 extends to and communicates with the heating member 22. This pipe 60 has a valve 61 therein which may be opened and closed by a reversible motor 62. A blower fan 63 is provided in the member 17. This blower fan may be operated by a motor 64 to force the air which passes out of the pipe 56 throughout the length of the heating member 17. A valve 70 controls the passage of air through the fitting 50 to the pipe 51. This valve 70 may be operated by a motor 71.

In order to supply cooled air to the pipe 54 instead of warm air as previously described, I provide a cooling device including a compressor 75, a coil 76 and a cooling chamber 77. This cooling device may be of any general type and may be operated by an electric motor 78. The cooling device includes a container having a pipe 81 through which air may pass to be cooled. This passageway 81 has a valve 82 therein. This valve 82 is controlled by a motor 83. When the valve 70 is closed and the valve 82 opened, cooled air will be forced into the cooling member 17 and into the cooling member 22 previously described. The particular arrangement of the heating and cooling system may be varied to suit the particular requirements of each installation and I may employ more than one of the systems on each aircraft depending on the requirements in each case.

In certain cases it may be found desirable to supplement the heat produced from the operating engines by means of an electrically operated heating member 90. This heating member 90 is preferably made of fabric such as cloth and has resistance wires 91 or other heating elements embedded therein. The flow of electricity through these members 90 heats them. These members are preferably disposed adjacent the upper ends of the compartments 15 with one at each side of the central heating compartment 22.

The aircraft illustrated in the drawing is shown as provided with fourteen compartments and with fourteen pairs of heating elements 90 as shown diagrammatically in Fig. 6. It will be understood however, that this arrangement of heating elements is merely for the purpose of illustration and that the number and arrangement can be varied without departing from the spirit of my invention.

The heating elements 90 are wired in pairs and each is provided with a lead 91 which is connected by leads 92 to one terminal 93 of switches 96 all of which switches are in circuit with a lead 97 to a generator 98. The other terminals 99 of each heating element are in circuit with a lead 100 which is connected to the other terminal of the generator 98. It will thus be apparent that by independent operation of the switches 96 the circuit to the separate heating members 90 will be controlled so that selectivity of operation of these heating elements may be secured. It is frequently desirable that all of the heating elements 90 be quickly brought into operation and for this purpose I provide a switch 105 which has a plurality of contacts 106 thereon. One terminal of this switch 105 is connected to the lead 97 while the contacts 106 are adapted to engage contacts 107 on leads 108 which are continuations of the leads 95 previously mentioned. It will thus be apparent that the heating members 90 may be controlled selectively or as a unit.

I prefer to use the electrical heating elements when the heat from the exhaust is insufficient or when it is desired to cool some compartments while others are being heated.

In order to operate the motors 34 which drive the shaft 33 to control the valves 29 and 36 I connect one terminal 110 of these motors with a lead 111 which is in circuit with the lead 100 to the generator 98. The companion terminals 114 of the motors 34 are connected by a lead 115 with a terminal 116 of a switch 117 which is connected by a lead 118 with the lead 97 of the generator 98. The other terminals 119 of the motors 34 are connected by leads 120 to the terminal 121 of the reversing switch 117 previously mentioned. The companion terminals 122 are connected by leads 123 with the lead previously mentioned. In the neutral position the switch 117 does not furnish current to the motors, but in extreme position it will serve to operate the motor in a different direction so that the valves may be operated as described.

The motor 64 is controlled by a switch 125 which is connected to the lead 181 and which is also connected by means of a lead 126 with the terminal 127 of the motor. The other terminal 128 of the motor is connected by a lead 124 with the lead 111 previously described.

The motor 71 which controls the valve 50 is connected by leads 130 and 131 to terminals 132 and 133 of a reversing switch 134 which is connected to the lead 118. The other terminals of the motor 71 are connected by leads 135 and 136 with the lead 111, so that as the switch 134 is operated the motor 71 may be stopped or may be caused to operate in either direction.

The motor 78 which operates the cooling device is connected by a lead 140 with the lead 111. It is also connected by a lead 141 with a switch 142 which is in circuit with the lead 118. The construction is such that upon closing of the switch 142 the motor 78 will be caused to operate.

The motor 53' which operates the blower 53 is connected by a lead 145 with the lead 140 and is connected by a lead 146 with a switch 147 which is in circuit with the lead 118 so that when the switch 147 is closed the motor 53' will be operated.

The motor 58 which operates the valve 57 is connected by leads 150 and 151 to a reversing switch 152 and is connected by a lead 154 with the lead 111 and by a lead 155 with the lead 100 and the construction is such that by operating the switch 158 the motor may be run in either direction or stopped.

The reversible motor 62 which operates the valve 61 is connected by leads 160 and 161 with a switch 162 which is connected to the lead 118. The motor 62 is also connected by a lead 163 with the lead 111 and by lead 164 with the lead 129, previously mentioned, and the construction is such that by operating the switch 162 the motor 62 will be controlled.

The motor 83 which operates the valve 82 is connected by leads 166 and 167 with a switch 168 which is in circuit with the lead 118. The motor 83 is also connected by a lead 169 with the lead 111 previously mentioned and the construction is such that when the switch 168 is actuated, the operation of the motor will be controlled.

From the foregoing description it will be apparent that I have provided a highly efficient thermal circulation system for aircraft which is highly efficient and which is compact, light in weight and easy to install and operate.

Having thus described my invention, I claim:

1. An aircraft comprising an elongated body having a rigid gas holding compartment therein, a flexible electric heating element arranged exteriorly of said compartment and shaped to conform to the shape of the wall of the compartment, and means to supply current to said heating element.

2. An aircraft comprising an elongated body having a plurality of gas holding compartments therein, an elongated hollow heating member arranged within said compartments, a second hollow member secured without but adjacent to said gas holding compartments, an internal combustion engine for propelling said aircraft, means to convey exhaust gases from said internal combustion engine to said heating members and means to cut off either said second or both of said heating members from said exhaust gases.

3. An aircraft comprising an elongated body having a plurality of gas holding compartments therein, an elongated hollow heating member arranged within said compartments, a second hollow member secured adjacent to the top of the aircraft in close proximity to the upper portion of said gas holding compartments, an internal combustion engine for propelling said aircraft, means to convey exhaust gases from said internal combustion engine to said heating members, means to cut off either said second or both of said heating members from said exhaust gases, means to cool air and means to direct the cooled air to the said hollow members.

4. An aircraft comprising an elongated body having a plurality of gas holding compartments therein, an elongated hollow member arranged within said compartments, a second hollow member secured adjacent the top of said aircraft in close proximity to the upper portion of said gas holding compartments, an internal combustion engine for propelling said aircraft, means to convey exhaust gases from said internal combustion engine to said heating members and means to shut off either of said heating members from said exhaust gases.

5. An aircraft comprising an elongated body having a plurality of gas holding compartments therein, an elongated hollow member extending substantially through the center of said compartments, an arcuate hollow member secured adjacent the top of said aircraft in close proximity to the upper portion of said gas holding compartments, an internal combustion engine for propelling said aircraft, means to convey exhaust gases from said internal combustion engine to said heating members, means to control the passage of gases to said heating members, flexible fabric mats secured adjacent to the upper part of said gas compartments, said flexible mats having heating elements therein and means to supply electric current to said elements, said means including a circuit to the electric heating means on each compartment and means for controlling said circuits.

6. An aircraft comprising an elongated body having a plurality of gas holding compartments therein, an electric heating device associated with each compartment and means to operate said devices together or selectively, said compartments having other heating means associated therewith, means to operate said other heating means, said other heating means being operable independently of said electric heating means.

In testimony whereof, I hereunto affix my signature.

CHARLES S. HALL.